(12) United States Patent
Wang et al.

(10) Patent No.: US 8,909,815 B2
(45) Date of Patent: Dec. 9, 2014

(54) DEVICES AND METHODS FOR MULTIPLE DATA STREAMS OVER USB 2.0

(71) Applicants: Xin Wang, Beijing (CN); Ning Zhu, San Jose, CA (US); Kewei Yang, Saratoga, CA (US)

(72) Inventors: Xin Wang, Beijing (CN); Ning Zhu, San Jose, CA (US); Kewei Yang, Saratoga, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 13/671,222

(22) Filed: Nov. 7, 2012

(65) Prior Publication Data

US 2014/0129740 A1    May 8, 2014

(51) Int. Cl.
*G06F 13/00*   (2006.01)
*G06F 3/00*    (2006.01)

(52) U.S. Cl.
CPC .......................................... *G06F 3/00* (2013.01)
USPC .................................. 710/2; 710/21; 710/62

(58) Field of Classification Search
None
See application file for complete search history.

(56) References Cited

U.S. PATENT DOCUMENTS

| | | | | |
|---|---|---|---|---|
| 6,663,420 | B1* | 12/2003 | Xiao | 439/502 |
| 7,513,038 | B2* | 4/2009 | Koh | 29/854 |
| 7,791,312 | B2* | 9/2010 | Kook | 320/108 |
| 7,980,898 | B2* | 7/2011 | Chatterjee | 439/660 |
| 8,135,883 | B2* | 3/2012 | Monks et al. | 710/38 |
| 2006/0053239 | A1* | 3/2006 | Zheng et al. | 710/72 |
| 2010/0169511 | A1* | 7/2010 | Dunstan et al. | 710/16 |
| 2010/0260336 | A1* | 10/2010 | Mulcahy | 380/210 |
| 2010/0272102 | A1* | 10/2010 | Kobayashi | 370/389 |
| 2011/0191480 | A1* | 8/2011 | Kobayashi | 709/227 |
| 2011/0296215 | A1* | 12/2011 | Mobin et al. | 713/323 |
| 2012/0203937 | A1* | 8/2012 | Mohanty et al. | 710/16 |
| 2013/0080665 | A1* | 3/2013 | Park et al. | 710/60 |

FOREIGN PATENT DOCUMENTS

JP   2003187930 A * 7/2003 ............. H01R 31/08

OTHER PUBLICATIONS

USB30, Universal Serial Bus 3.0 Specification, Jun. 2011, pp. 1-15.*

* cited by examiner

*Primary Examiner* — Cheng-Yuan Tseng
(74) *Attorney, Agent, or Firm* — Carr & Ferrell LLP (57) ABSTRACT

Provided are devices and methods for transmitting two or more data streams through the same cable. An exemplary cable includes at least two sets of conductive points, each set capable of independently transmitting a separate data stream. The cable may be a USB 2.0 type cable, with two contacts assigned for transmitting one data stream, and two other contacts assigned for transmitting another data stream. In some embodiments, one data stream is an audio-video signal transmitted to an audio-video receiver.

14 Claims, 11 Drawing Sheets

DEVICES AND METHODS FOR MULTIPLE DATA STREAMS OVER USB 2.0

BACKGROUND

Mobile phones, tablet computers, laptops, ultra-books, and other types of mobile electronic devices are becoming increasingly popular for media content generating, retrieving, and transmitting as well as for data storage and exchange. However, these devices are often not ideal for viewing content because of their small displays and low powered audio outputs. To transmit media data, such as movie clips, pictures, and other types of data, these electronic devices are often connected to other devices, such as computer displays, televisions, projectors, and the like. Various interconnecting devices, such as cables and/or various combinations of dongles and cables, may be used for this purpose.

The multifunctional nature of many new mobile devices often requires connection to multiple different external devices, such as displays, computer systems, storage devices, and other types of devices, with each one of these external devices often requiring a separate cable. Plugging and unplugging multiple cables into a mobile device, which often has a single connection port (e.g., a micro-USB port), is often cumbersome and does not allow utilizing multiple external devices together with one mobile device.

SUMMARY

Provided in an exemplary embodiment are methods for transmitting two or more data streams through the same cable. The cable includes at least two sets of conductive points, each set capable of independently transmitting separate data streams. The cable may be a USB 2.0 type cable. Pins 2 and 3 may be assigned for transmitting one data stream, while pins 4 and 5 may be assigned for transmitting another data stream. For example, one data stream may be an audio-video signal transmitted to an audio-video receiver.

In certain embodiments, a method for providing two data streams between a first device and a second device over a cable involves detecting a coupling between the first device and the second device. The coupling may be implemented via a USB 2.0 interface, which includes a plurality of conductive points. The method may involve providing a first data stream between the first device and the second device over a first subset of the conductive points and providing a second data stream between the first device and the second device over a second subset of the conductive points. The method may also involve providing a third data stream over the first subset of the conductive points and the second subset of the conductive points. In certain embodiments, the first subset of the conductive points corresponds to contact numbers 2 and 3 of the USB 2.0 interface, while the second subset of the conductive points corresponds to contact numbers 4 and 5 of the USB 2.0 interface.

In certain embodiments, the first device may include a mobile device. In these situations, the USB 2.0 interface comprises a micro-USB interface. The first device may be coupled to a docking station. The first device may assign the first data stream to the first subset of conductive points and the second data stream to the second subset of conductive points. The second device may include one of a USB 2.0 transceiver, a DisplayPort transmitter, or a Mobile High Definition Link (MHL) transmitter.

In some embodiments, the method also involves stopping providing the second data stream between the first device and the second device over the second subset of the conductive points, while continuing providing the first data stream between the first device and the second device over the first subset of the conductive points. The method may involve assigning a ground potential to a conductive point of the second subset of the conductive points. The USB 2.0 interface is capable of transmitting data streams through the first subset of the conductive points and separately through the second subset of the conductive points at speeds of up to 10 Gbps.

In some embodiments, the method also involves transmitting a sideband communication stream. The sideband communication stream may be transmitted at the same time with the first data stream through the first subset of the conductive points. In some embodiments, the first data stream may be a USB 2.0 data stream, and the second data stream is an Audio-Video data stream. The second device may be a dock device connected to a USB Hub device receiving the first data stream and an Audio-Video stream receiver receiving the second data stream. The first data stream and the second data stream may be provided through the same cable. The first subset of the conductive points and the second subset of the conductive points may be parts of the same connector. In some embodiments, the first subset of the conductive points includes two conductive points, while the second subset of the conductive points comprises two other conductive points.

Also provided are data transmitting cables, with each capable of transmitting one or more data streams between two or more devices. A cable may have three or more connectors for connecting one device to two or more additional devices. The cable may include an integrated circuit controlling connections between conductive points of these connectors and able to change these connections depending on data transmission requirements. In certain embodiments, the same data stream may be transferred between first and second connectors and between first and third connectors of a cable. At some point, the integrated circuit may change connections between conductive points of at least two connectors and allow different data streams to be transferred between the two pair of connectors. For example, a USB 2.0-type data stream may be transferred between the first and second connectors. At the same time, Mobile High-definition Link (MHL)-type media streaming may occur between the first and third connectors.

In certain embodiments, a cable for transmitting data includes a first connector, second connector, third connector, and integrated circuit. The first connector includes a first plurality of conductive points for establishing a micro-USB type of connection. The second connector includes a second plurality of conductive points for establishing a USB type of connection. The third connector includes a third plurality of conductive points for establishing multiple different connection types. The integrated circuit is configured to control connections between the first plurality of conductive points and the second plurality of conductive points and between the first plurality of conductive points and the third plurality of conductive points.

In certain embodiments, the connections between the first plurality of conductive points and the third plurality of conductive points are variable and controlled by a setting of the integrated circuit. These settings may be determined automatically by the integrated circuit based on a connection type established by the third connector. The first plurality of conductive points of the first connector may include a power conductive point and two first data transmission conductive points. The second plurality of conductive points may include two second data transmission conductive points, with each independently connected to each of the two first data transmission conductive points. The two independent connections between the two first data transmission conductive points and two second data transmission conductive points may be permanent. These permanent connections may be maintained by the integrated circuit or some other components of the cable. The two independent connections between the two first data transmission conductive points and two second data transmission conductive points may be according to USB 2.0 protocol.

In certain embodiments, the third plurality of conductive points includes two third data transmission conductive points, with each independently connected to each of the two first data transmission conductive points. In other embodiments, the third plurality of conductive points may include two third data transmission conductive points, with each independently connected to each of two first additional data transmission conductive points that are different from the two first data transmission conductive points. The integrated circuit is configured to change connections in accordance with the two different embodiments listed above. That is, the integrated circuit is configured to change connections from the two third data transmission conductive points being connected to the two first data transmission conductive points to the two third data transmission conductive points being connected to the two first additional data transmission conductive points and vice versa. As such, in certain embodiments, the cable is configured to deliver the same data stream. In other embodiments, the cable is configured to deliver two different data streams.

In certain embodiments, the third connector includes a High-Definition Multimedia Interface (HDMI) connector. In the same or other embodiments, the cable comprises a MHL transmitter. One of the connectors may be arranged into a docking station. One or more of the first connector, second connector, and third connector may be a male connector.

In certain embodiments, a cable includes a micro-USB type connector, USB type connector, general connector, and integrated circuit. The micro-USB type connector may include a first set of data transmitting conductive points and a second set of data transmitting conductive points. The USB type connector may include a third set of data transmitting conductive points, with each independently connected to each of the first set of data transmitting conductive points of the micro-USB type connector. The general connector may include a fourth set of data transmitting conductive points. The integrated circuit may switch connections from the fourth set of data transmitting conductive points being connected to the first set of data transmitting conductive points to the fourth set of data transmitting conductive points being connected to the second set of data transmitting conductive points and back.

Also provided is a method for transmitting data involving providing a cable including a micro-USB type connector with a first set of data transmitting conductive points and a second set of data transmitting conductive points, a USB type connector with a third set of data transmitting conductive points, and a general connector with a fourth set of data transmitting conductive points. The method also involves transmitting a first data stream between the first set of data transmitting conductive points and a combination of the third set of data transmitting conductive points and the fourth set of data transmitting conductive points. The method may proceed with switching connections between conductive points of the connector and the micro-USB type connector using an integrated circuit of the cable followed by concurrently transmitting a second data stream and a third data stream. In this case, the second data stream is transmitted between the first set of data transmitting conductive points and the third set of data transmitting conductive points, while the third data stream is transmitted between the second set of data transmitting conductive points and the fourth set of data transmitting conductive points.

These and other embodiments are described further below with reference to the figures.

DETAILED DESCRIPTION

Traditional data transfer cables are generally capable of running one data stream between a transmitter and receiver. As such, only two devices are interconnected using the same cable, which creates substantial limitations for such multi-functional devices, such as mobile phones, tablets, and the like, which have a limited number of ports. For example, a mobile phone having an internal memory and internet connectivity may be used as a data storage device and as a media transmitter. However, most mobile phones are equipped with a single port (e.g., a micro-USB port) in order to keep the size of the phones to a minimum. Changing cables attached to this single port for data transfer and then for media streaming may be cumbersome. Furthermore, it may be desirable to perform these operations simultaneously.

Provided are methods for transmitting two data streams through the same cable. The cable includes two sets of conductive points, each set capable of independently transmitting separate data streams. The cable may be a USB 2.0 type cable. Pins 2 and 3 may be assigned for transmitting one data stream, while pins 4 and 5 may be assigned for transmitting another data stream. For example, one data stream may be an audio-video signal transmitted to an audio-video receiver.

Also provided are data transmitting cables, where each is capable of transmitting one or more data streams between two or more devices. The cable may include an integrated circuit controlling connections among its conductive points depending on data transmission requirements. Alternatively, this conductive point assignment may be implemented on the device. In certain embodiments, the same data stream may be transferred between first and second connectors and between first and third connectors of a cable. At some point, the integrated circuit may change connections between conductive points of at least two connectors and allow different data streams to be transferred between the two pair of correctors. For example, a USB 2.0-type data stream may be transferred between the first and second connectors. At the same time, MHL-type media streaming may occur between the first and third connectors. In certain embodiments, the cable may include a docking station. In this and other related examples provided below the second and third connectors may be integrated into the same physical body and may be connected to a single device, such as a docking station.

In essence, the same connector may be used for two different purposes accomplished by two different modes of operation. In one mode, data transfer is transferred in accordance, for example, to the USB protocol or, more specifically, in accordance to the USB 2.0 protocol. This transmission may be accomplished between two devices (e.g., between a mobile device having a micro-USB port and a computer system having a standard USB port). In certain embodiments, a third device is connected by the same cable, and the same data stream is shared by all three devices. In another mode, the connection scheme between conductive points of the cable is changed, thereby allowing the transfer of two different data streams. The two mode operation may be illustrated with reference to a USB cable or, more specifically, to a USB 2.0 cable. A typical micro-USB cable includes five conductive points: one is used for power (+5V), two others are used for data transfer (D− and D+), one more is used for distinguishing a host connection from a slave connection, and the last one is used for a signal ground. The following table presents pin assignments in accordance with the USB 1.x/2.0 Mini/Micro protocol.

TABLE 1

| Pin | Name | Cable color |
| --- | --- | --- |
| 1 | VBUS | Red |
| 2 | D− | White |
| 3 | D+ | Green |
| 4 | ID | None |
| 5 | GND | Black |

A cable including a micro-USB connector on one end may utilize only pins 2 and 3 for data transfer. These pins, which are sometimes referred to as conductive points of a connector, are interconnected with respective conductive points of another connector of the same cable. In other words, a pair of data transmitting conductive points interconnected with a corresponding pair of data transmitting conductive points of another connector is a typical USB cable configuration.

In comparison to conventional cables, the cables presented in this application include additional connectors (i.e., third connectors). These three-connector cables may operate in two regimes depending on a number of data transfer streams needing to be transmitted through this cable. Using the above listed pin assignment for micro-USB connectors and continuing with that example, a three-connector cable may utilize only pins 2 and 3 in its micro-USB connector when a single data stream transmittance is needed. These pins may be connected to a pair of data transmitting conductive points of a second connector and, at the same time, to another pair of data transmitting conductive points of the third connector. The second and third connector may be standard USB connectors or some other connectors used, for example, for data streaming. In a different mode of operation, two separate data streams may need to be transferred through the same cable. Both data streams may be exchanged by the same device connected to the micro-USB connector. To separate the streams, an additional pair of pins/conductive points is needed at the micro-USB connector, and pins 4 and 5 may be used for this purpose. In this mode, pins 2 and 3 are connected to data transfer conductive points of the second connector, and these connections are used for transmitting the first data stream. At the same time, pins 4 and 5 are connected to data transfer conductive points of the third connector, and these connections are used for transmitting the second data stream. Connections of the data transfer conductive points of the third connector have been changed from being connected to pins 2 and 3 in one mode to being connected to pins 4 and 5 in another mode. This connection change may be achieved by an integrated circuit, which is a part of the cable. The integrated circuit may be housed in one of the connectors or some other components of the cable.

Various cables, dongles, and other types of devices may be used for data transmission between two devices and performing other functions. These data transmission devices may be divided into two general categories: active devices and passive devices. Active devices use embedded integrated circuits (e.g., a silicon chip) to boost performance of these devices and perform other functions, such as changing connection between different sets of conductive points. Passive devices do not include integrated circuits and could degrade the data they carry, due to such "channel impairments" as attenuation, crosstalk, and group velocity distortion. Furthermore, passive devices usually have constant connections between different conductive points that cannot be modified. Embedding integrated circuitry into the data transmission devices also allows the cross-section of the data transmission wires to be reduced, reduces the overall form factor and weight of the device, and provides other functions and benefits. For example, active devices allow for longer reach and lower power consumption. Examples of active data transmission devices include ANX7805, ANX7730, and ANX9832 supplied by Analogix Semiconductor, Inc. in Santa Clara, Calif.

Data transmission devices may be also categorized into cables and dongles. A cable is used for direct connection to both transmitter and receiver. A dongle is generally a shorter version of the cable and is used to connect to one or more other cables. Therefore, a dongle may be only connected to either one of a transmitter or receiver but not both. A dongle generally has one or more male connectors on one end and one or more female connectors on the other end. A cable typically has male connectors on both ends.

Both cables and dongles consist of two or more wires running side by side and bonded, twisted, or braided together to form a single assembly, which is often referred to as a flexible member of a dongle or cable. Connectors (male or female) are provided on three or more ends of this flexible member. When a data transmission device is active and includes an integrated circuit, this circuit may be integrated into one of the connectors or, more specifically, into a base member that encloses the circuit and supports one of the connectors.

In certain embodiments further described below, a cable includes a male micro or mini-USB connector on one end and a standard male display interface connector at the other end, such as an HDMI connector, Video Graphics Array (VGA) connector, and the like. The micro or mini-USB connector may be used for connecting to a mobile device, while the HDMI connector may be plugged into a Television (TV) set. When the mobile device initiates a media display on its interface, the corresponding data is transmitted to and displayed on the TV set. The integrated circuit may be embedded into a base member supporting the HDMI connector. Cable lengths can vary as desired, up to a total length of up to 5 meters.

Figure 1A:
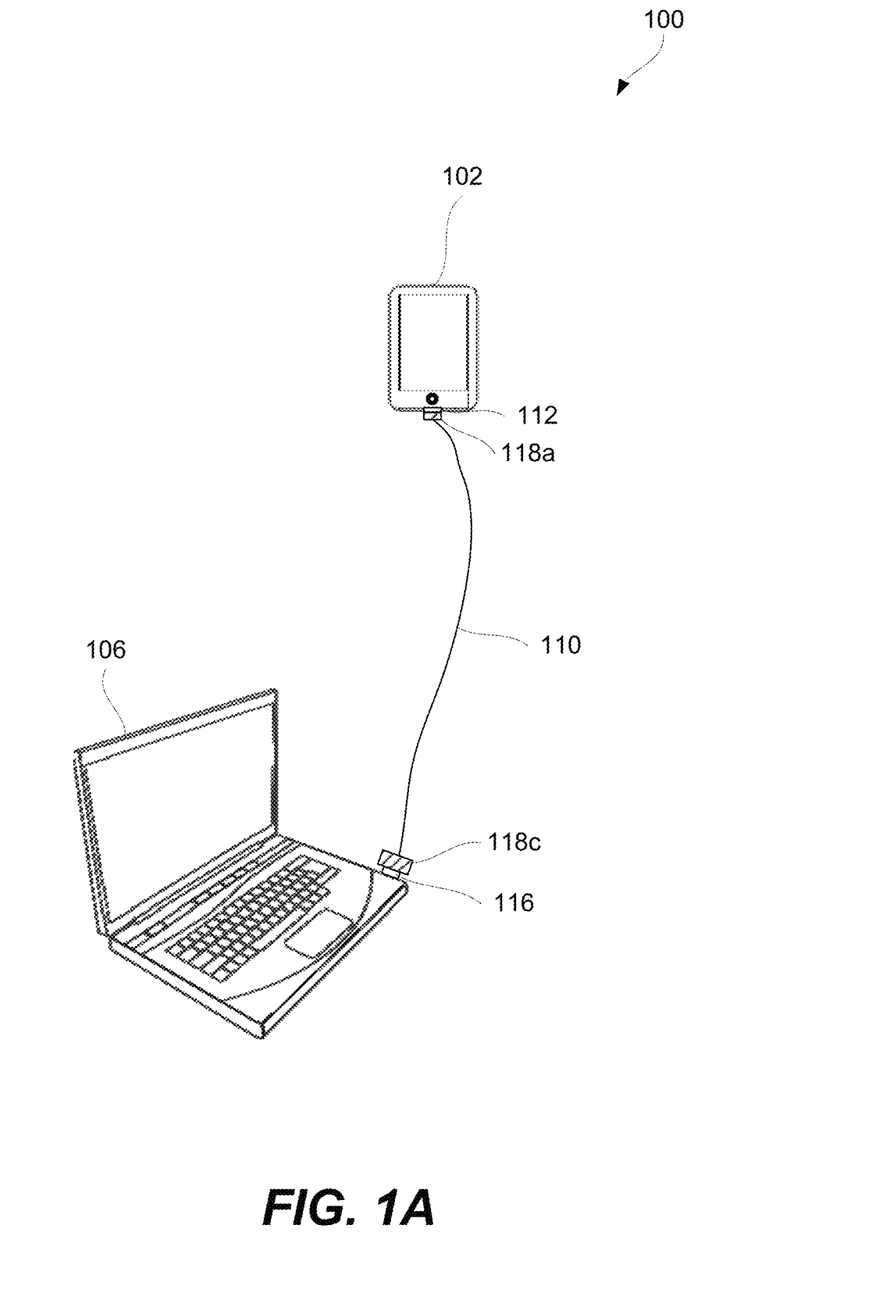
FIG. 1A is a schematic representation of a system including two devices interconnected by a cable transmitting two separate data streams between these two devices, in accordance with certain embodiments.

Some of these features will now be explained in more detail with reference to various figures. FIG. 1A is a schematic representation of system 100, which includes two devices 102 and 106 interconnected by cable 110, in accordance with certain embodiments. Some examples of devices include mobile computers, smartphones, tablet computers, handheld game consoles, portable media players, digital still cameras (DSC), digital video cameras (DVC or digital camcorder), audio-video systems, TV sets, computer displays, video projectors, and the like.

Each device includes a data port. For example, device 102 includes port 112, while device 106 includes port 116. Ports 112 and 116 are used for connecting to cable 110 or, more specifically, to connectors 118a and 118c of cable 110. The types of ports 112 and 116 correspond to the types of connectors 118a and 118c. For example, if port 112 is a micro-USB port, then connector 118a is a micro-USB connector. Ports 112 and 116 are generally female-type connectors, meaning that connectors 118a and 118c are generally male-type connectors.

Figure 6A:
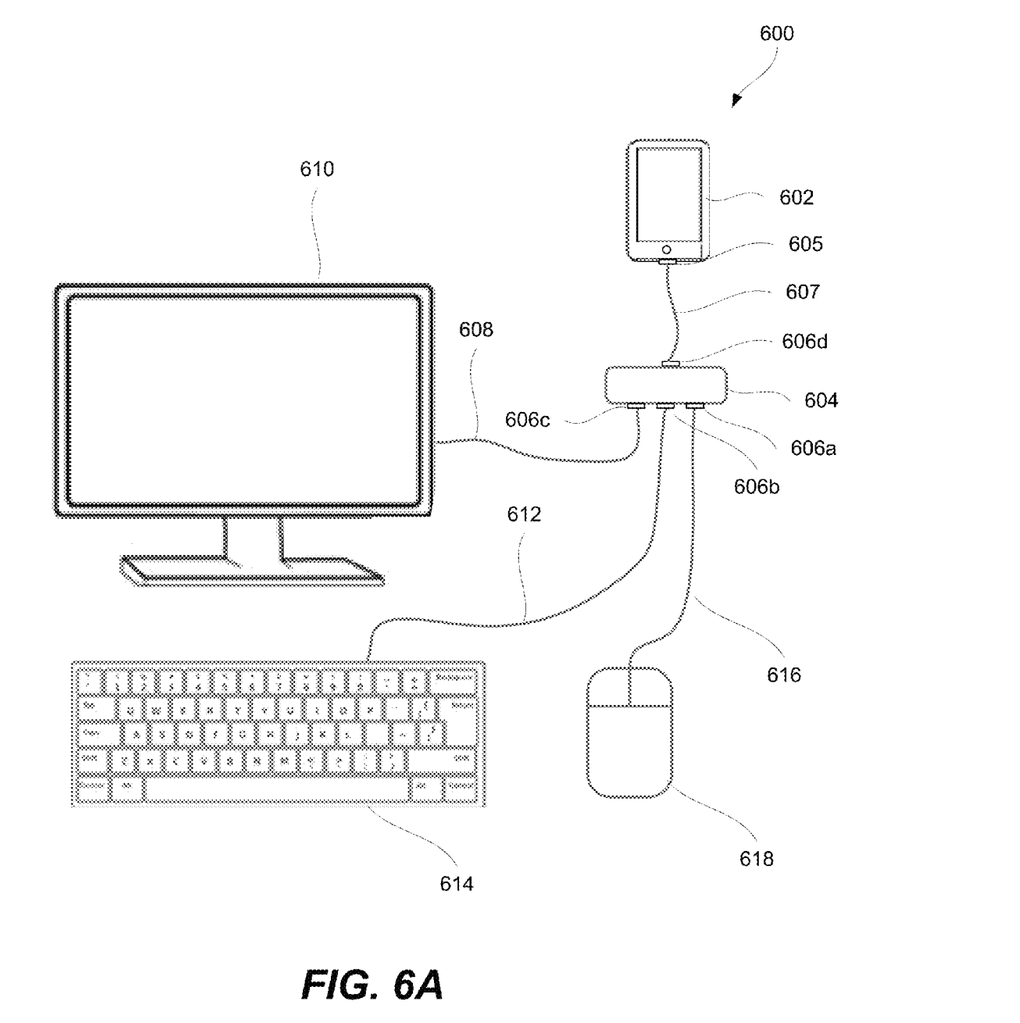
FIG. 6A is a schematic representation of a system connecting a device using a docking station, in accordance with certain embodiments.
Figure 6B:
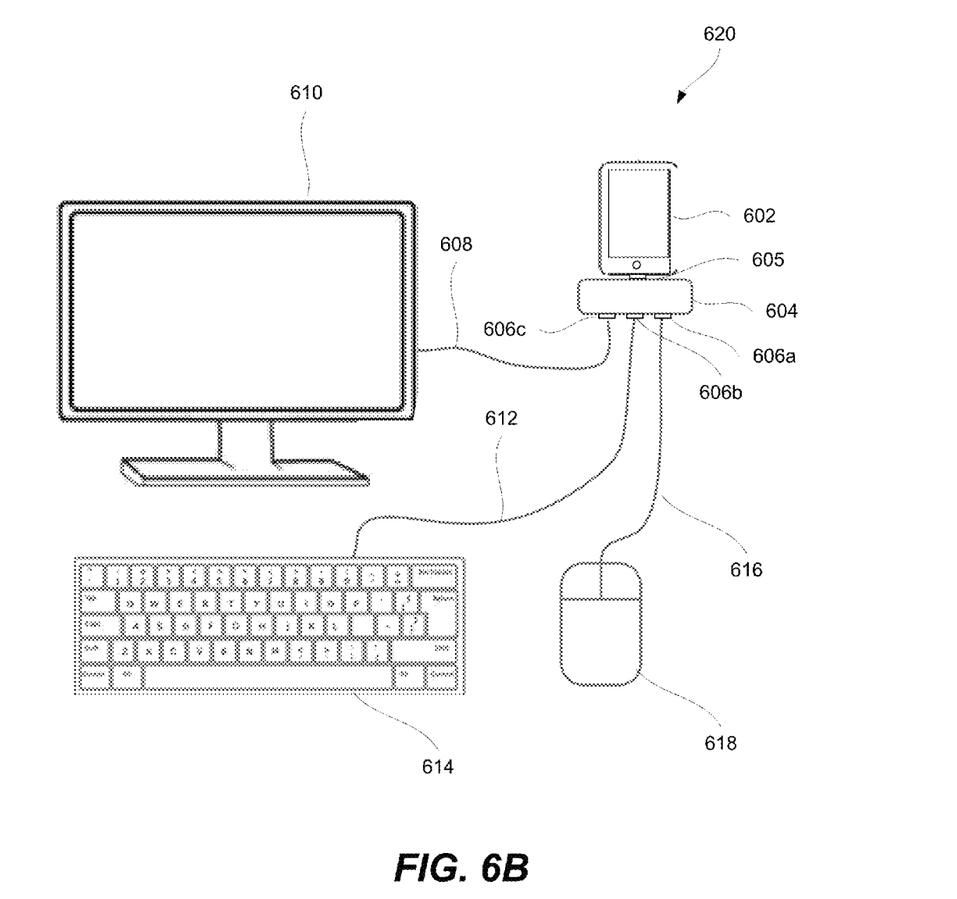
FIG. 6B is a schematic representation of a system connecting a device using a docking station, in accordance with other embodiments.

Connectors 118a and 118c may be provided in the same docket as further illustrated in FIG. 6B, or may be spaced apart and connected by corresponding flexible members. Specifically, FIG. 1A illustrates cable 110 having a flexible member interconnecting connectors 118a and 118c. The flexible member may include two or more sets of wires that are insulated with respect to each other and integrated by a common insulating sheath. Likewise, each one of connectors 118a and 118c includes two sets of conductive points. Each set of conductive points and wires may be used to transfer a separate data stream. The two data streams transferred through cable 110 may be the same or different.

A flexible member allows one connector provided at one end of this flexible member to move with respect to another connector provided at the other end of the flexible member. The length of a flexible member may be at least about 1 meter or, more specifically, at least about 2 meters, and even at least about 4 meters. Standard cable lengths, such as 6 feet, 12 feet, 25 feet, 50 feet, and 100 feet may also define the length of a flexible member.

Figure 1B:
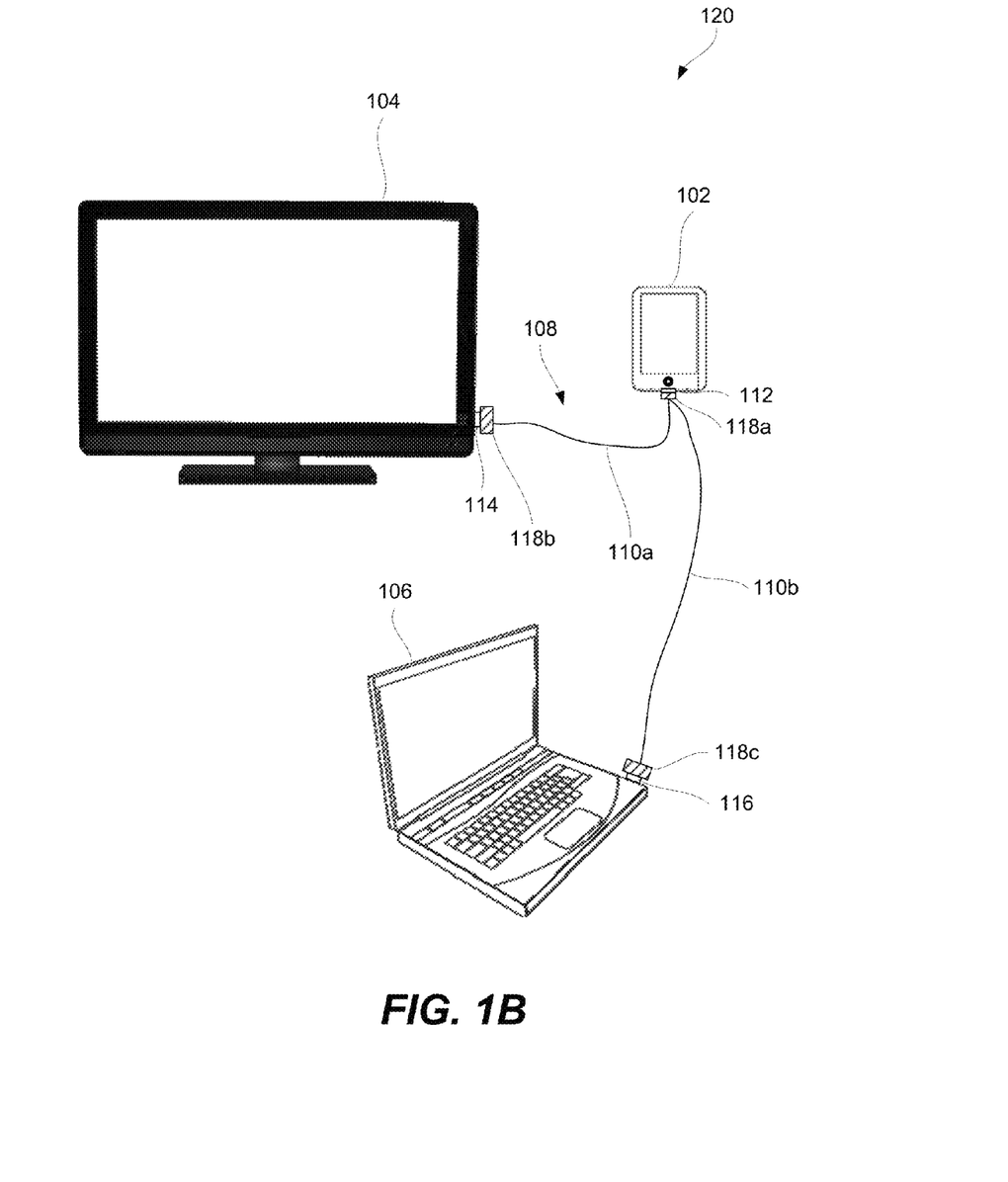
FIG. 1B is a schematic representation of another system including three devices interconnected by a cable transmitting one or two separate data streams among these three devices, in accordance with certain embodiments.

FIG. 1B is a schematic representation of system 120, which includes three devices 102, 104, and 106 interconnected by cable 108, in accordance with certain embodiments. Each device includes a data port. For example, data transmission device 102 includes port 112, data transmission device 104 includes port 114, and data transmission device 106 includes port 116. Ports 112, 114, and 116 are used for connecting to cable 108 or more specifically to connectors 118a, 118b, and 118c of cable 108. As explained above, connectors 118a, 118b, and 118c may be provided in the same docket or may be spaced apart and connected by corresponding flexible members. Specifically, FIG. 1B illustrates cable 108 having first flexible member 110a interconnecting connectors 118a and 118b and second flexible member 110b interconnecting connectors 118b and 118c.

Various types of video and data connectors may be used as connectors 118a, 118b, and 118c. Some of these examples are presented below with reference to FIGS. 4A-4F and FIGS. 5A-5D. In specific embodiments, one connector is a micro- or mini-USB connector configured for connections to various mobile devices such as a mobile phone, a laptop computer, and a tablet computer. In the same or other embodiments, another connector is an HDMI connector, VGA connector, or Digital Visual Interface (DVI) connector. In specific embodiments, one connector is a micro-USB connector, while the second connector is a HDMI connector, and the third connector is a standard USB connector.

Figure 2A:
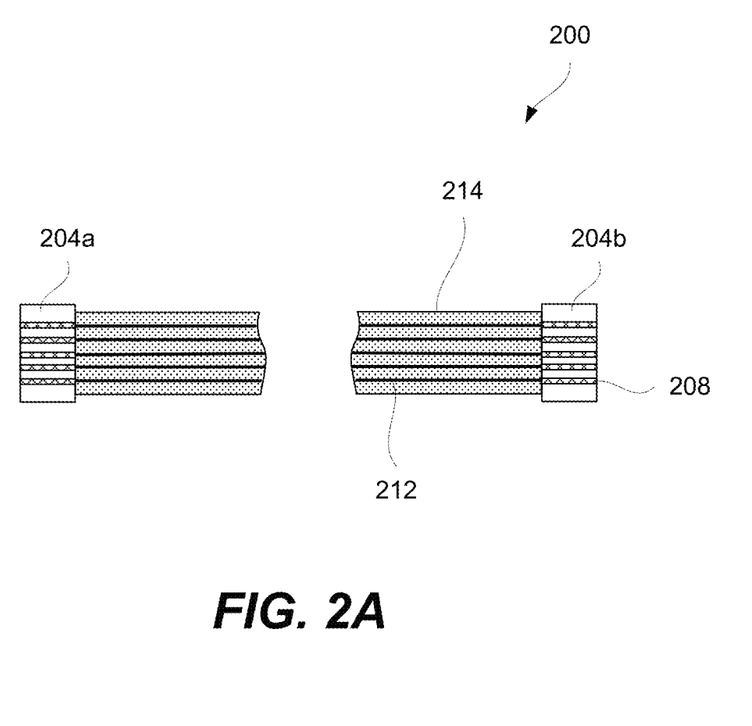
FIG. 2A is a schematic representation of a cable, in accordance with certain embodiments.

An example of a cable is illustrated in FIG. 2A showing cable 200 having two connectors 204a and 204b and a flexible member 214 extending between the two connectors 204a and 204b. Each connector includes multiple conductive points 208, including a first set of conductive points for transmitting one data stream and another set of conductive points for transmitting another data stream. Each conductive point may be connected to a corresponding conductive lead 212 of flexible member 214, which in turn connect this point to a corresponding conductive point of another connector. Various connection schemes are further described below with reference to FIGS. 3A and 3B.

Figure 2B:
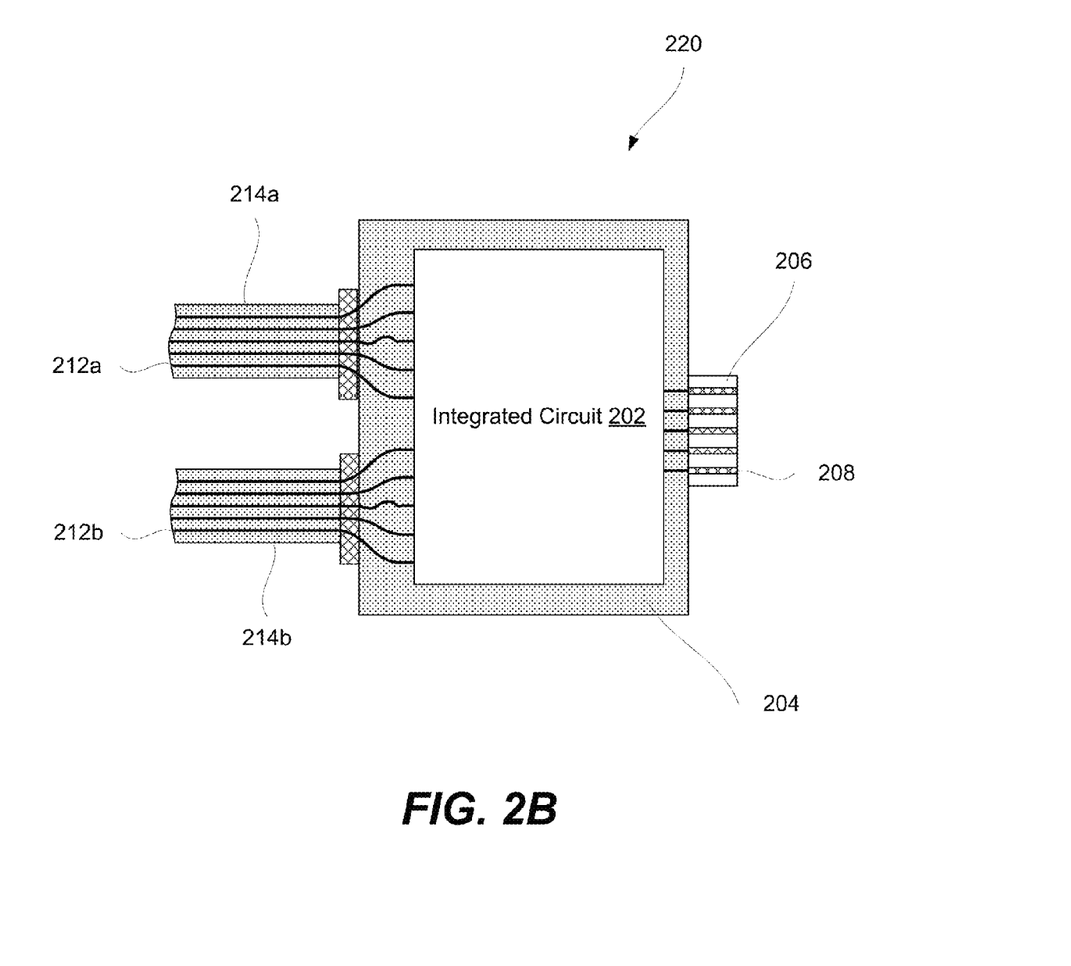
FIG. 2B is a schematic representation of a connector of a cable, in accordance with certain embodiments.

In certain embodiments, a cable includes an integrated circuit for changing connections between data transmission conductive points. Specifically, FIG. 2B is a schematic representation of a cable portion 220 including an integrated circuit 202, in accordance with certain embodiments. In this example, integrated circuit 202 is provided in a housing 204 attached to connector 206 having conductive points 208. Connector 206 may be a micro-USB connector, standard USB connector, HDMI connector, or any other type of connector as described elsewhere in this document. Housing 204 may be attached to or receive two flexible members 214a and 214b, each including conductive lines 212a and 212b. Conductive lines 212a and 212b are attached to their respective conductive points provided on other ends of flexible members 214a and 214b. In certain embodiments, these connections between conductive lines 212a and 212b and their conductive points are permanent.

Integrated circuit 202 may provide and adjust connections between conductive lines 212a and 212b and conductive points 208 as will be further explained with reference to FIGS. 3A and 3B below. In certain embodiments, one set of conductive lines 212a and 212b (either a set of flexible member 214a or a set of flexible member 214b) maintains permanent connections to conductive points 208, either through integrated circuit 202 or bypassing integrated circuit 202. In these embodiments, only connections between the remaining conductive lines 212a and 212b and a portion of conductive points 208 are adjustable by integrated circuit 202.

As mentioned above, an integrated circuit may be provided in its own housing directly interfacing with one of the connectors (as, e.g., shown in FIG. 2) or may be provided within a housing of one of the connectors. In these examples, there may be no flexible members provided in between the integrated circuit and adjacent connector. One or more other connectors may be attached by respective flexible members. In another example, an integrated circuit may be separated by flexible members from all of the connectors of a cable. In this example, a separate housing may be provided or formed around the connector. In yet another example, all three connectors and integrated circuits may be provided within the same docking station. One of these connectors may be a male connector for connecting directly to a device (e.g., a micro-USB connector), while the other two or more connectors may be female connectors for connecting to cables.

Figure 3A:
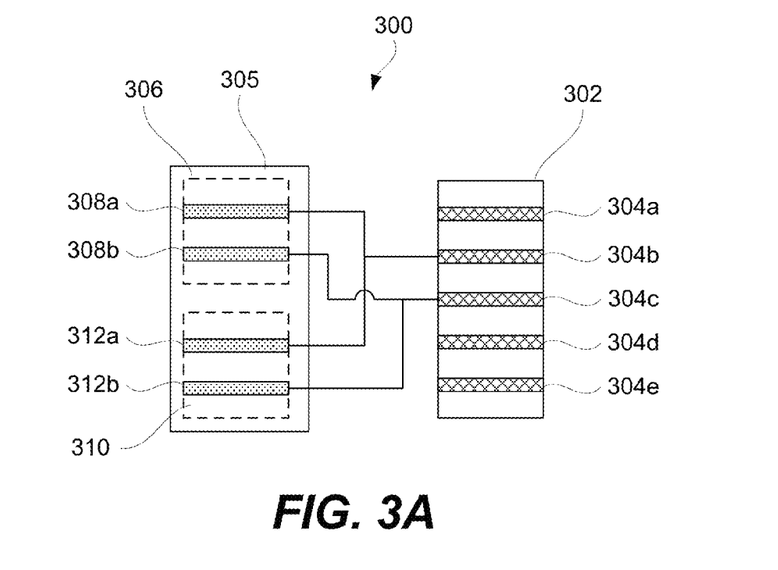
FIGS. 3A and 3B are schematic representations of two connection schemes among conductive points of two connectors of a cable, in accordance with certain embodiments.
Figure 3B:
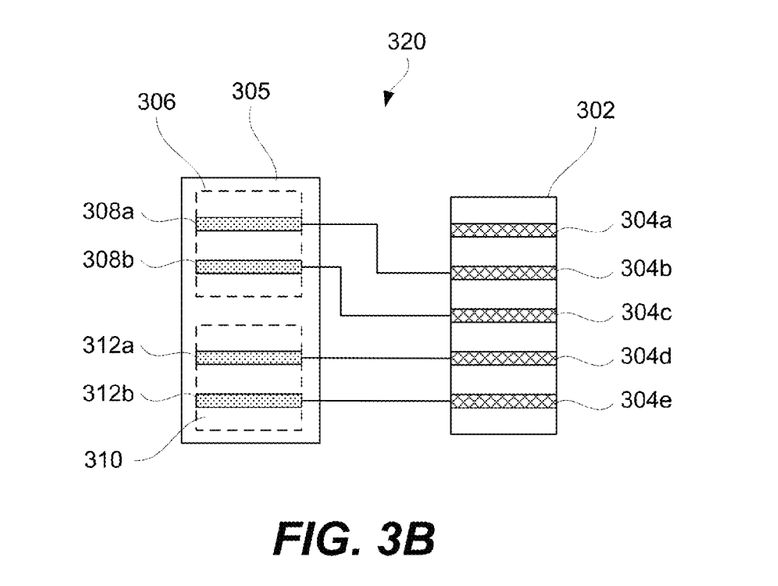
Figure 4A:
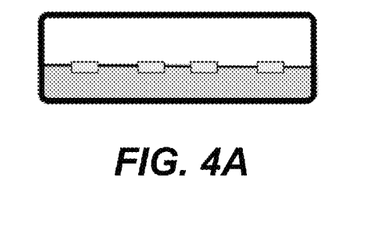
FIGS. 4A-4F are schematic representations of cable connectors for connecting to various devices, in accordance with certain embodiments.
Figure 4B:
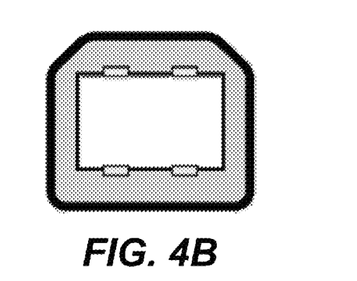
Figure 4C:
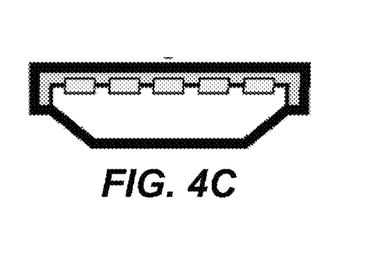
Figure 4D:
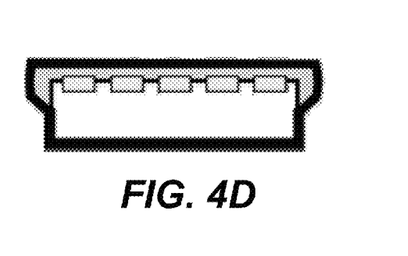
Figure 4E:
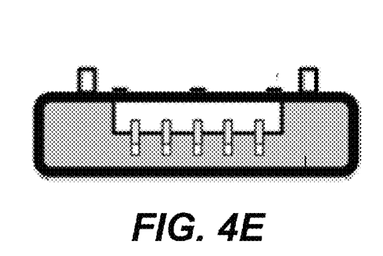
Figure 4F:
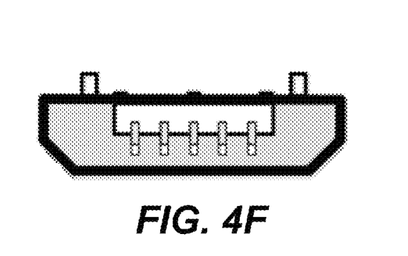

FIGS. 3A and 3B are schematic representations of two (connection) schemes 300 and 320 among conductive points of two or three connectors of a cable, in accordance with certain embodiments. Each scheme shows three connectors 302, 306, and 310 and their respective conductive points (i.e., conductive points 304a-304e of connector 302, conductive points 308a-308b of connector 306, and conductive points 312a-312b of connector 310). In some embodiments, connectors 306 and 310 are integrated into the same connector 305 for connection to a single device. For simplicity, the rest of the description of FIGS. 3A and 3B pertains to three connector examples. However, one having ordinary skills in the art would understand that this description also applies to two connector examples as well. It should be noted that each of the connectors may include additional conductive points. Furthermore, as can be seen from FIGS. 3A and 3B, some conductive points may not participate in data streaming. For example, conductive point 304a of connector 302 may be used for supplying power.

FIG. 3A represents connection scheme 300 that may be used for transmitting the same data stream between connectors 302 and 306 and between connectors 302 and 310. As explained above, connectors 306 and 310 are integrated into the same connector 305 for connection to a single device. For example, connector 302 may be connected to a data stream transmitter, while connectors 306 and 310 are connected to data stream receivers that receive the same data stream transmitted by the data transmitter. In general, a data transmitter may be connected to any one of the three connectors 302, 306, and 310, while the other two connectors may be connected to receiver. In this scheme 300, conductive points 304b and 304c (e.g., pins 2 and 3 of a micro-USB connector) are separately connected to conductive points 308a and 308b and, in a similar but separate manner, connected to conductive points 312a and 312b. More specifically, conductive point 304b is connected to conductive point 308a and, the same time, is connected to conductive point 312a. As such, conductive points 308a and 312a are also connected. In this scheme 300, if data is streamed using conductive point 304b, the same data will also pass through conductive points 308a and 312a. In a similar manner, conductive point 304c is connected to conductive point 308b and, at the same time, is connected to conductive point 312b. As such, conductive points 308b and 312b are also connected. In this scheme 300, if data is streamed using conductive point 304c, the same data will also pass through conductive points 308b and 312b. In a more general view, the data that passes through a pair of conductive points 304b and 304c will also pass through a pair of conductive points 308a and 308b and a pair of conductive points 312a and 312b. Since these are the only operational conductive points in this scheme, then one can also say that the same data passed through connector 302 will also pass through connectors 306 and 310.

Switching to FIG. 3B, connection scheme 320 is different from connection scheme 300 described above. Changes between connection schemes 300 and 320 may be provided by an integrated circuit. Connection scheme 320 may be used for transmitting two different data streams: one data stream between connectors 302 and 306 and another data stream between connectors 302 and 310. Of course, the two data streams may be the same in certain embodiments, and their content and transmission may be controlled by one of the devices connected to the cable (e.g., a transmitter).

In one example, connector 302 may be connected to a data stream transmitter, while connectors 306 and 310 may be connected to data stream receivers that receive different data streams transmitted by the data transmitter. In a more specific example, connector 302 may be connected to a smart phone, while connector 306 may be connected to a video display, and connector 310 may be connected to a USB-type device.

In this scheme 320, conductive points 308a and 312a are not connected. Likewise, conductive points 308b and 312b are not connected. This decoupling of conductive points of connectors 306 and 310 allows transmitting different data streams through these connectors.

In this scheme 320, conductive points 304b and 304c (e.g., pins 2 and 3 of a micro-USB connector) are separately connected to conductive points 308a and 308b. Conductive points 304d and 304e (e.g., pins 4 and 5 of a micro-USB connector) are separately connected to conductive points 312a and 312b. As such, four conductive points 304b-304e of connector 302 may participate in data streaming in this example.

Scheme 320 may be represented by the following table with reference to specific types of connectors. The difference between scheme #1 and scheme #2 in the table may be achieved by flipping connections to pins 4 and 5 of the micro-USB connector.

TABLE 2

| USB 2.0 and $2^{nd}$ transceiver Signal Mapping (scheme # 1) | USB 2.0 and $2^{nd}$ transceiver Signal Mapping (scheme # 2) | Micro-USB 2.0 Connector Pin Number |
|---|---|---|
| VBUS | VBUS | 1 |
| D− | D− | 2 |
| D+ | D+ | 3 |
| data_p | data_n | 4 |
| data_n | data_p | 5 |

Various examples of receiver and transmitter input data ports are presented in FIGS. 4A-4F and FIGS. 5A-5D. Specifically, FIGS. 4A-4F are schematic representations of cable connectors for connecting to media transmitters, in accordance with certain embodiments. These represent different types of USB cables, such as a mini-A type USB, mini-B type USB, micro-A type USB, micro-B type USB, and other types. USB connectors have five connector pins, which are sometimes referred to as conductive points. One of these pins is used to provide an electrical power and usually maintained at a voltage of about 5V. Two other pins are used for data transmission (i.e., "Data+" and "Data−"). Yet another pin is used to distinguish between A-type and B-type USB connectors. Finally, the last pin may be used for a signal ground.

Figure 5A:
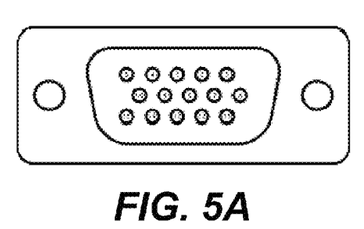
FIGS. 5A-5D are schematic representations of cable connectors for connecting to various devices, in accordance with certain embodiments.
Figure 5B:
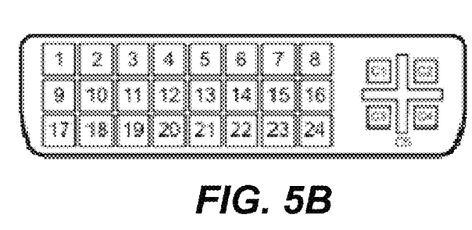
Figure 5C:
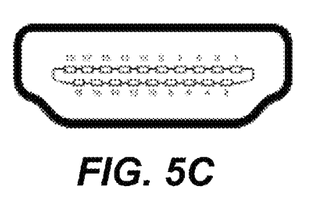
Figure 5D:
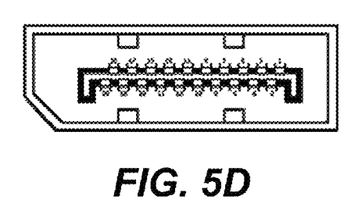

FIGS. 5A-5D are schematic representations of cable connectors for connecting to media receivers, in accordance with certain embodiments. Specifically FIG. 5A depicts a 15-pin VGA connector, FIG. 5B depicts a DVI-I connector, FIG. 5C depicts a 19-pin HDMI connector, and, finally, FIG. 5D depicts a 20-pin display port external source side connector. Each one of these connectors includes one electrical power pin, which may operate at about 5V, at about 3.3V, or some other standard voltage rating.

FIG. 6A is a schematic representation of a system 600 including a docking station 604 for connecting to device 602 using cable 607. Specifically, cable 607 interconnects a port 605 of device 602 and with docking port 606d of docking station 604. In some embodiments, such as system 620, shown in FIG. 6B, device 602 is connected directly to docking station 604. Docking station 604 also has peripheral ports 606a-606c, in accordance with certain embodiments. Docking station 604 may be used for connecting multiple peripheral devices 610, 614, and 618 to (central) device 602. For example, a smartphone or tablet computer may be used as central devices. Usually, the smartphone or tablet computer only includes a port, and connecting multiple peripheral devices directly to the smartphone or tablet computer may be impossible. Yet, the smartphone or tablet computer may have sufficient computing power to interact with multiple peripheral devices. In specific embodiments, docking station 604 is used to receive a smartphone or tablet computer. It includes port 605 for establishing connections to the smartphone or tablet computer. In specific embodiments, port 605 is a micro-USB port.

Docking station 604 also includes three peripheral ports 606a-606c for making connection to peripheral devices display 610, keyboard 614, and mouse 618 (or some other input and output devices). These connections may be provided by cables 608, 612, and 616, which may be parts of docking station 604. In other embodiments, cables 608, 612, and 616 are separate components or parts of peripheral devices 610, 614, and 618. Internal connections between port 605 and peripheral ports 606a-606c may be according to one or more schemes described above. For example, (docking) port 605 and peripheral port 606c may have a dedicated connection not shared by any other ports. This connection may be used to transmit video signal from device 602 to video display 610. Port 605 and peripheral ports 606a and 606b may be shared for data transfer. In certain embodiments, docking station 604 may be implemented in a form of a cable without providing any mechanical support to device 602.

Figure 7A:
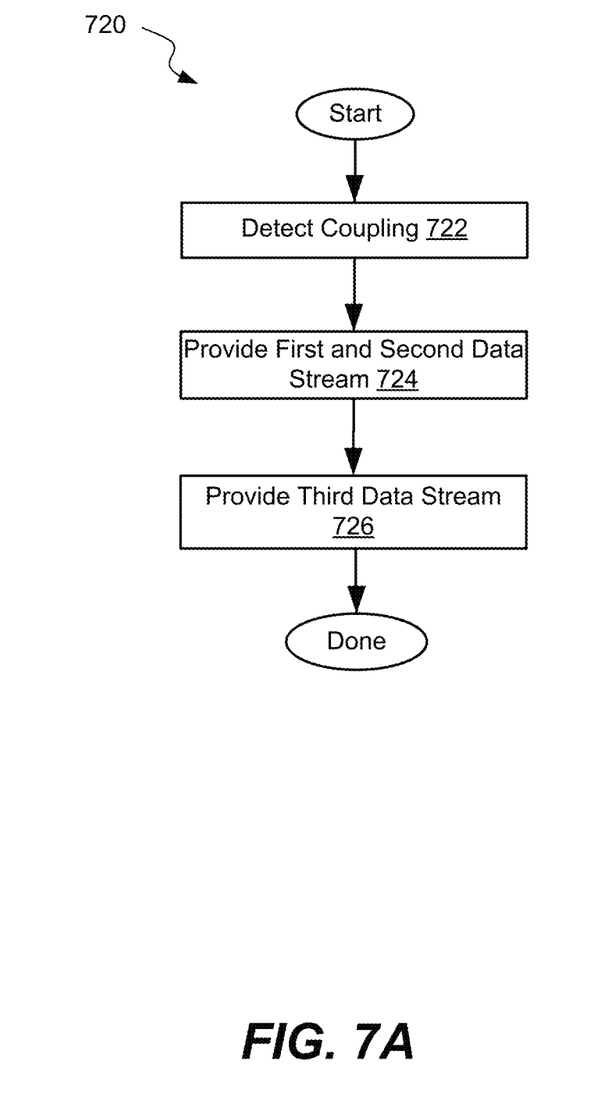
FIG. 7A is a process flowchart corresponding to a method of transmitting data using a cable, in accordance with certain embodiments.

FIG. 7A is a process flowchart corresponding to method 720 for providing two data streams between a first device and a second device over a cable, in accordance with some embodiments. Method 720 may commence with detecting a coupling between the first device and the second device during operation 722. The coupling may be implemented via a USB 2.0 interface, which includes a plurality of conductive points. Method 720 may proceed with providing a first data stream between the first device and the second device over a first subset of the conductive points and providing a second data stream between the first device and the second device over a second subset of the conductive points during operation 724. Various connection schemes may be used for this data transmission as explained above. In certain embodiments, the first subset of the conductive points corresponds to contact numbers 2 and 3 of the USB 2.0 interface, while the second subset of the conductive points corresponds to contact numbers 4 and 5 of the USB 2.0 interface. Method 720 may proceed with providing a third data stream over the first subset of the conductive points and the second subset of the conductive points during operation. During this operation, the first and second data stream may not be transmitted through the interface. A single third data stream may be transmitted instead. The third data stream may be transmitted, in operation 726, through the one set of conductive points or through both sets of conductive points.

Figure 7B:
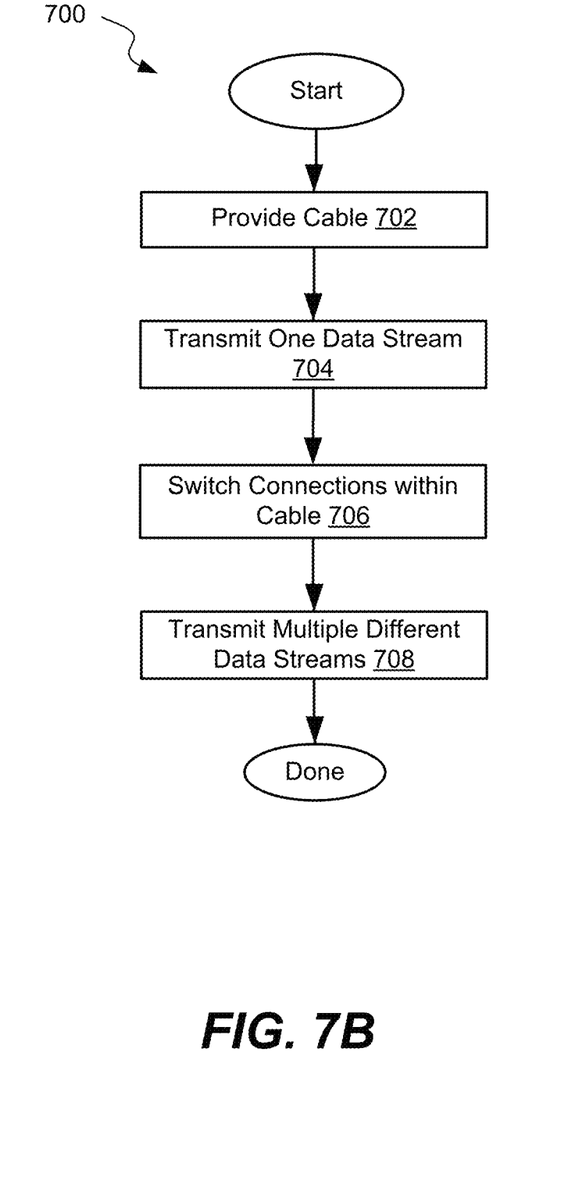
FIG. 7B is another process flowchart corresponding to a method of transmitting data using a cable, in accordance with other embodiments.

FIG. 7B is a process flowchart corresponding to a method 700 of transmitting data using a cable, in accordance with certain embodiments. Method 700 may start with providing a cable during operation 702. Various examples of cables are described above with reference to various figures. A cable may include a micro-USB type connector with a first set of data transmitting conductive points and a second set of data transmitting conductive points, a USB type connector with a third set of data transmitting conductive points, and a general connector with a fourth set of data transmitting conductive points. The micro-USB type connector may be connected to one device (e.g., a data transmitter). The USB type connector may be connected to another device (e.g., a data receiver). Finally, the general connector may be connected to yet another device (e.g., another data receiver, which may be a video display).

During operation 704, method 700 may proceed with transmitting a first data stream between the first set of data transmitting conductive points and a combination of the third set of data transmitting conductive points and the fourth set of data transmitting conductive points. The same data stream is shared by all three devices connected to the cable.

Method 700 may then proceed with switching connections between conductive points of the connector and the micro-USB type connector using an integrated circuit of the cable followed by concurrently transmitting a second data stream and a third data stream, during operation 706. For example, the connection scheme illustrated in FIG. 3A and described above may be changed into the connection scheme illustrated in FIG. 3B. This switching and changing of connection schemes may now allow transmitting two separate data streams. As explained above, the switching may be performed by an integrated circuit.

Method 700 may proceed with transmitting two data streams during operation 708. One of these data streams is transmitted between the first set of data transmitting conductive points and the third set of data transmitting conductive points. The other data stream is transmitted between the second set of data transmitting conductive points and the fourth set of data transmitting conductive points. In certain embodiments, the two data streams transmitted during operation 708 are different. In other embodiments, these operations are the same.

While various embodiments have been described above, it should be understood that they have been presented by way of example only and not limitation. The descriptions are not intended to limit the scope of the present disclosure to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the present invention should, therefore, be determined not with reference to the above description, but instead should be determined with reference to the appended claims along with their full scope of equivalents.

What is claimed is:

1. A method for providing two data streams between a mobile device and a docking station, the method comprising:
   detecting a coupling between the first mobile device and the docking station, the coupling being implemented via a micro-USB 2.0 connector, the micro-USB 2.0 connector having a plurality of no more than five conductive points;
   providing a USB 2.0 data stream between the mobile device and the docking station over a first subset of two of the no more than five conductive points of the micro-USB 2.0 connector; and
   providing a high-definition audio-video data stream between the mobile device and the docking station over a second subset of two other of the no more than five conductive points of the micro-USB 2.0 connector,
   the first subset of the conductive points and the second subset of the conductive points being part of the same micro-USB 2.0 connector.

2. The method of claim 1, further comprising providing a third data stream over the first subset of the conductive points and the second subset of the conductive points.

3. The method of claim 1, the first subset of the conductive points corresponds to contact numbers 2 and 3 of the micro-USB 2.0 connector.

4. The method of claim 1, the second subset of the conductive points corresponds to contact numbers 4 and 5 of the micro-USB 2.0 connector.

5. The method of claim 1, wherein the mobile device assigns the USB 2.0 data stream to the first subset of the conductive points and the high-definition audio-video data stream to the second subset of the conductive points.

6. The method of claim 1, the docking station comprising one of a USB 2.0 transceiver, a DisplayPort transmitter, or a Mobile High Definition Link (MHL) transmitter.

7. The method of claim 1, wherein at least the high-definition audio-video data stream is transmitted through the second subset of the conductive points at speeds of up to 10 Gbps.

8. The method of claim 1, further comprising transmitting sideband communication streams.

9. The method of claim 8, wherein the sideband communication streams are transmitted at the same time with the USB 2.0 data stream through the first subset of the conductive points.

10. The method of claim 1, wherein the docking station is a dock device receiving the USB 2.0 data stream and an Audio-Video stream receiver receiving the high-definition audio-video data stream.

11. The method of claim 1, wherein the USB 2.0 first data stream and the high-definition audio-video data stream are provided through one cable.

12. A method for providing two data streams between a mobile device and a docking station over a cable:
  providing a cable comprising two micro-USB 2.0 connectors, one on each end of the cable, each micro-USB 2.0 connector comprising a first subset of two conductive points and a second subset of two conductive points;
  connecting one of the two micro-USB 2.0 connectors to a first mobile device and another one of the two micro-USB 2.0 connectors to a docking station; and
  transmitting two separate data streams between the mobile device and the docking station at the same time, wherein one of the two separate data streams is transmitted over the first subset of two conductive points while another one of the two separate data streams is a high-definition audio-video data stream transmitted over the second subset of two conductive points.

13. The method of claim 1, wherein the second subset of the conductive points comprises at least one of an HDMI connector, a VGA connector, and a Digital Visual Interface (DVI) connector.

14. The method of claim 1, wherein the micro-USB 2.0 connector comprises an integrated circuit adapted to reconfigure the first subset of the conductive points and the second subset of the conductive points.

* * * * *